US011623631B2

(12) United States Patent
Hawley

(10) Patent No.: US 11,623,631 B2
(45) Date of Patent: Apr. 11, 2023

(54) CONTROL OF HYBRID VEHICLE ENGINE START THRESHOLD IN CONGESTED TRAFFIC CONDITIONS

(71) Applicant: Toyota Motor Engineering & Manufacturing North America, Inc., Plano, TX (US)

(72) Inventor: Thomas S. Hawley, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 321 days.

(21) Appl. No.: 16/890,342

(22) Filed: Jun. 2, 2020

(65) Prior Publication Data

US 2021/0370905 A1 Dec. 2, 2021

(51) Int. Cl.
*B60W 20/00* (2016.01)
*B60W 40/08* (2012.01)
(Continued)

(52) U.S. Cl.
CPC ...... *B60W 20/00* (2013.01); *B60W 30/18163* (2013.01); *B60W 40/08* (2013.01);
(Continued)

(58) Field of Classification Search
CPC .......... B60W 30/18018; B60W 20/00; B60W 30/18163; B60W 40/08; B60W 40/12;
(Continued)

(56) References Cited

U.S. PATENT DOCUMENTS

| 5,771,478 A | * | 6/1998 | Tsukamoto | B60T 1/10 180/65.6 |
| 6,093,974 A | * | 7/2000 | Tabata | B60W 30/1819 903/910 |

(Continued)

FOREIGN PATENT DOCUMENTS

| DE | 102016106466 A1 * | 10/2016 | ............... B60K 6/48 |
| JP | 3903628 A | 7/2000 | |

(Continued)

*Primary Examiner* — B M M Hannan
(74) *Attorney, Agent, or Firm* — Christopher G. Darrow; Darrow Mustafa PC

(57) ABSTRACT

A system for controlling an internal combustion engine start threshold in a parallel hybrid-electric vehicle. A predetermined conditions tracking module determines whether or not conditions of a plurality of predetermined conditions exist. Responsive to a determination that the conditions exist, a required power estimation module estimates a next acceleration required by the vehicle and a final power requirement for the next acceleration. A propulsion system control module determines if the estimated final power requirement is between a first amount of electric motor power available at a predetermined base engine start threshold and a second amount of electric motor power available at a predetermined elevated engine start threshold. If the estimated final power requirement is between the first and second amounts of power, operation of the vehicle is controlled so as to ensure that the engine start threshold is at the predetermined elevated threshold.

20 Claims, 8 Drawing Sheets

(51) Int. Cl.
*B60W 40/12* (2012.01)
*F02N 11/08* (2006.01)
*B60W 30/18* (2012.01)

(52) U.S. Cl.
CPC ............ *B60W 40/12* (2013.01); *F02N 11/08* (2013.01); *B60W 2510/244* (2013.01); *B60W 2510/246* (2013.01); *B60W 2552/15* (2020.02)

(58) Field of Classification Search
CPC ..... B60W 2510/244; B60W 2510/246; B60W 2552/15; B60W 2520/10; B60W 40/1005; B60W 2520/105; B60W 2554/4042; B60W 2556/10; B60W 20/12; B60W 20/40; B60W 30/188; B60W 40/04; B60W 40/076; B60W 50/0097; F02N 11/08; Y02T 10/62; B60K 6/48
USPC ............................................................ 701/22
See application file for complete search history.

(56) References Cited

U.S. PATENT DOCUMENTS

| | | | | |
|---|---|---|---|---|
| RE40,164 E | * | 3/2008 | Kuang | B60W 10/08 290/40 C |
| 9,421,967 B2 | * | 8/2016 | Ueno | B60W 20/10 |
| 10,369,982 B2 | * | 8/2019 | Gibson | B60W 20/00 |
| 2010/0145562 A1 | * | 6/2010 | Moran | B60W 20/13 180/65.28 |
| 2012/0059543 A1 | * | 3/2012 | Nakazono | B60W 30/18036 903/903 |
| 2012/0292919 A1 | * | 11/2012 | Suzuki | F02N 15/022 180/65.28 |
| 2012/0310460 A1 | * | 12/2012 | Sato | B60W 30/19 903/903 |
| 2013/0066498 A1 | * | 3/2013 | Nissato | B60W 10/06 903/930 |
| 2013/0184914 A1 | * | 7/2013 | Sujan | B60W 20/40 180/65.23 |
| 2015/0314768 A1 | * | 11/2015 | Wright | B60W 10/06 180/65.265 |
| 2016/0280210 A1 | * | 9/2016 | Lian | B60K 6/48 |
| 2016/0304086 A1 | * | 10/2016 | Mansour | F02N 11/0862 |
| 2018/0238290 A1 | * | 8/2018 | Siddiqui | F02D 41/042 |
| 2019/0359050 A1 | * | 11/2019 | Komuro | B60L 15/2045 |
| 2020/0378319 A1 | * | 12/2020 | Makkiya | F02N 11/0837 |

FOREIGN PATENT DOCUMENTS

| | | |
|---|---|---|
| JP | 2012086685 A | 5/2012 |
| KR | 20090118352 A | 11/2009 |

* cited by examiner

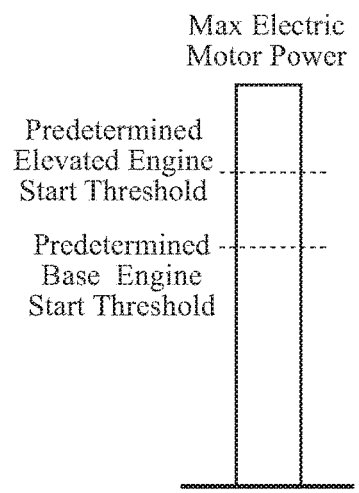
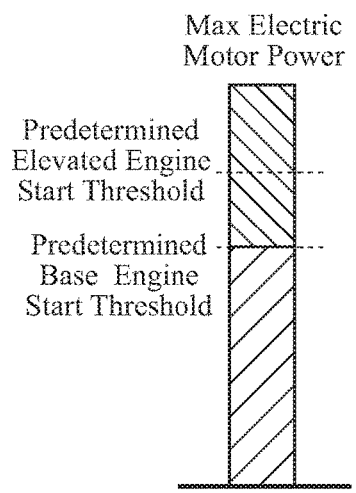
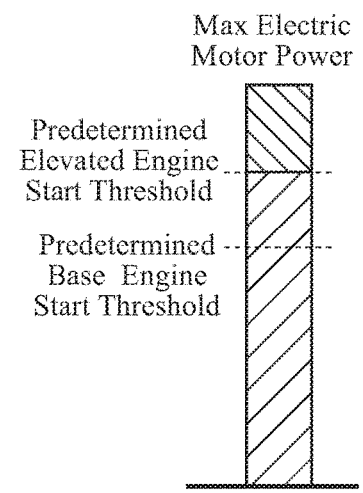
FIG. 1A  FIG. 1B  FIG. 1C
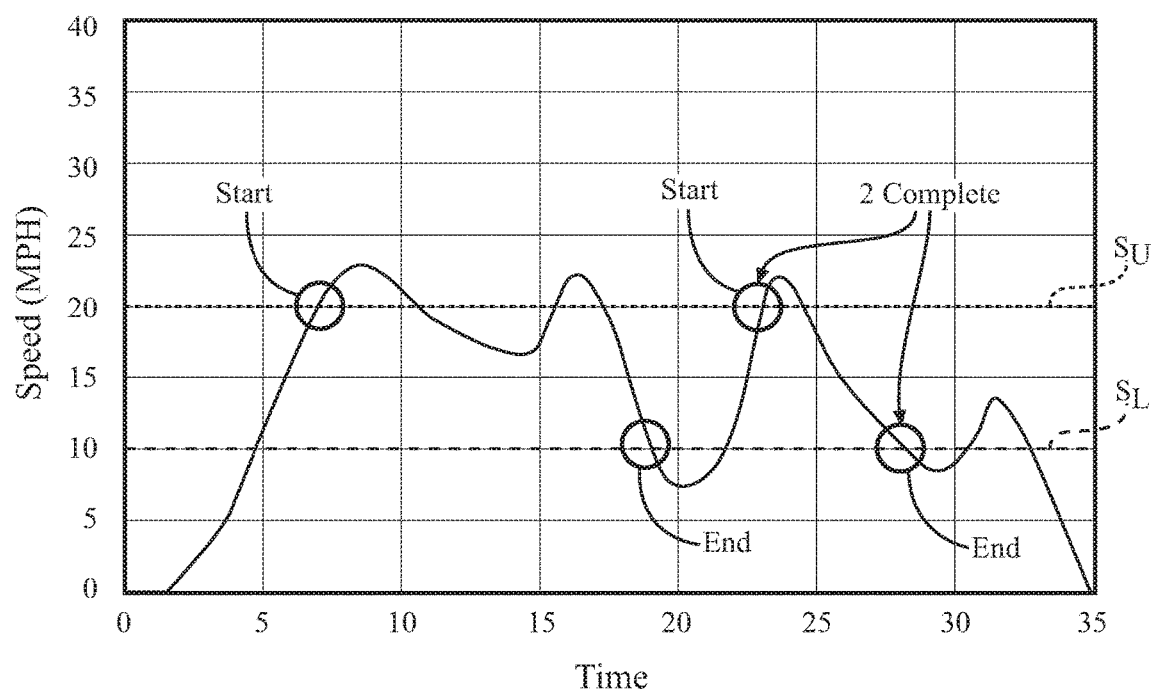
FIG. 3

FIG. 4
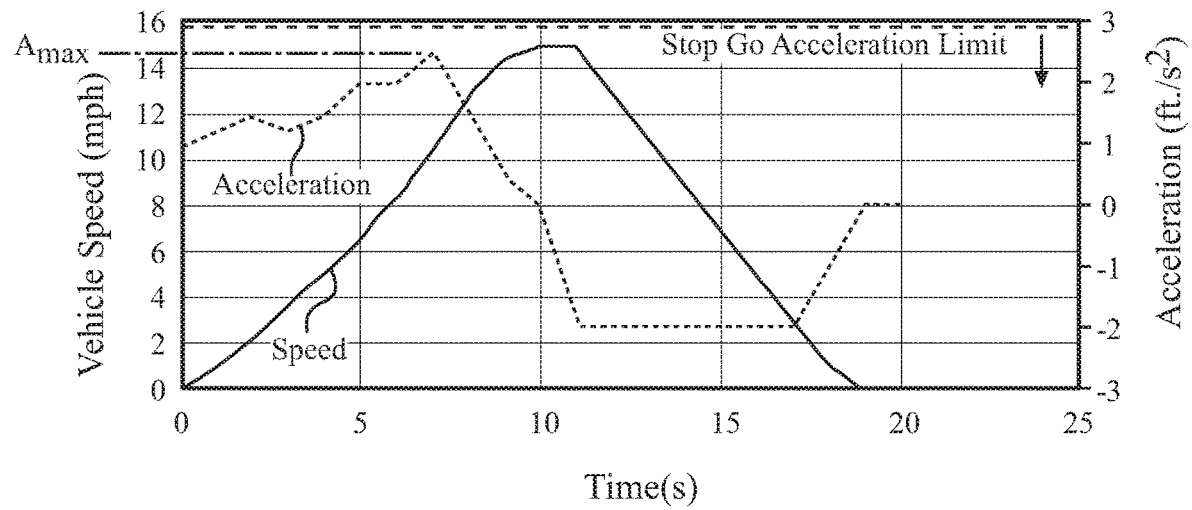
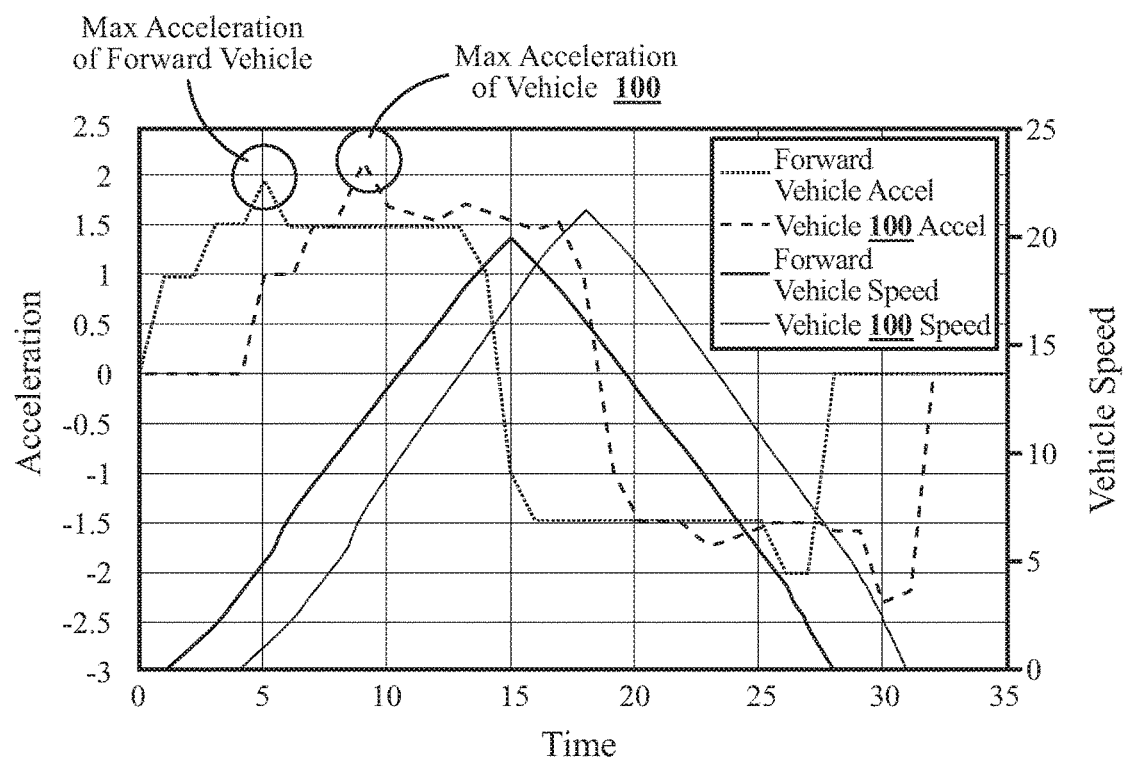
FIG. 5

CONTROL OF HYBRID VEHICLE ENGINE START THRESHOLD IN CONGESTED TRAFFIC CONDITIONS

TECHNICAL FIELD

The subject matter described herein relates to autonomous control of vehicle operating parameters and, more particularly, to control of an engine start threshold in a parallel hybrid-electric vehicle.

BACKGROUND

A parallel hybrid-electric vehicle may be powered by either (or both of) an electric motor and an internal combustion engine. Under certain conditions, the vehicle may switch over from electric motor power to internal combustion engine power and vice versa. For example, to provide a higher torque for moving the vehicle from a stopped condition, the vehicle may initially be powered by the electric motor. Later, when the vehicle reaches a relatively constant speed, the vehicle may switch over from electric motor power to internal combustion engine power. A threshold may be specified so that, above a certain power demand, the internal combustion engine is activated to take over for the electric motor. However, in congested or stop-and-go traffic conditions, the vehicle is constantly called upon to move from a stopped condition or to accelerate from a slow-moving condition. Depending on the engine start threshold level, this may cause closely-spaced, repeated starting and stopping of the internal combustion engine which may be annoying to vehicle occupants and wearing on vehicle components.

SUMMARY

In one aspect of the embodiments described herein, a system for controlling an internal combustion engine start threshold in a parallel hybrid-electric vehicle is provided. The system includes one or more processors and a memory communicably coupled to the one or more processors. The memory stores a predetermined conditions tracking module including computer-readable instructions that when executed by the one or more processors cause the one or more processors to determine whether or not conditions of a plurality of predetermined conditions exist. The memory also stores a required power estimation module including computer-readable instructions that when executed by the one or more processors cause the one or more processors to, responsive to a determination that the conditions of the plurality of predetermined conditions exist, estimate a next acceleration required by the vehicle and, using the estimated next acceleration required by the vehicle, estimate a final power requirement for the next acceleration. The memory also stores a propulsion system control module including computer-readable instructions that when executed by the one or more processors cause the one or more processors to determine if the estimated final power requirement is between a first amount of electric motor power available at a predetermined base engine start threshold and a second amount of electric motor power available at a predetermined elevated engine start threshold above the predetermined base engine start threshold and, if the estimated final power requirement is between the first and second amounts of electric motor power, control operation of the vehicle so as to ensure that the engine start threshold is at the predetermined elevated engine start threshold.

In another aspect of the embodiments described herein, a non-transitory computer readable medium is provided for controlling an internal combustion engine start threshold in a parallel hybrid-electric vehicle. The medium includes stored therein instructions that, when executed by a computing system, cause the computing system to perform functions comprising determining whether or not conditions of a plurality of predetermined conditions exist and, responsive to a determination that one or more conditions of the plurality of predetermined conditions do not exist, controlling operation of the vehicle so as to ensure that the engine start threshold is at a predetermined base engine start threshold. Responsive to a determination that the conditions of the plurality of predetermined conditions exist, an estimate of a next acceleration required by the vehicle may be generated. Using the estimated next acceleration required by the vehicle, an estimate of a final power requirement for the next acceleration may be generated. If the estimated final power requirement is between a first amount of electric motor power available at a predetermined base engine start threshold and a second amount of electric motor power available at a predetermined elevated engine start threshold above the predetermined base engine start threshold, operation of the vehicle may be controlled so as to ensure that the engine start threshold is at the predetermined elevated engine start threshold. If the estimated final power requirement is not between the first and second amounts of electric motor power, operation of the vehicle may be controlled so as to ensure that the engine start threshold is at the predetermined base engine start threshold.

In yet another aspect of the embodiments described herein, a method for controlling an internal combustion engine start threshold in a parallel hybrid-electric vehicle is provided. The method includes steps of determining whether or not conditions of a plurality of predetermined conditions exist and, responsive to a determination that one or more conditions of the plurality of predetermined conditions do not exist, controlling operation of the vehicle so as to ensure that the engine start threshold is at a predetermined base engine start threshold. Responsive to a determination that the conditions of the plurality of predetermined conditions exist, a next acceleration required by the vehicle is estimated. Using the estimated next acceleration required by the vehicle, a final power requirement for the next acceleration is estimated. If the estimated final power requirement is between a first amount of electric motor power available at a predetermined base engine start threshold and a second amount of electric motor power available at a predetermined elevated engine start threshold above the predetermined base engine start threshold, operation of the vehicle may be controlled so as to ensure that the engine start threshold is at the predetermined elevated engine start threshold. If the estimated final power requirement is not between the first and second amounts of electric motor power, operation of the vehicle may be controlled so as to ensure that the engine start threshold is at the predetermined base engine start threshold.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 1A is a bar graph showing a schematic representation of the maximum power available from the electric motor for a given battery state of charge (SOC).

FIG. 1B is a bar graph showing a condition where a non-variable predetermined base engine start threshold is used to control the point where an internal combustion engine is started in a parallel hybrid vehicle.

FIG. 1C is a bar graph showing a variable engine start threshold arrangement in accordance with the embodiments described herein.

FIG. 3 is a schematic representation of a condition where a vehicle has completed at least a specific number of consecutive speed variation cycles within a predetermined time period.

FIG. 4 is a schematic representation of a condition where a maximum speed of a vehicle during a predetermined time period is always less than a predetermined maximum allowable speed.

FIG. 5 is a schematic representation of a condition where a mirroring coefficient of a vehicle is less than a predetermined value over an associated predetermined time period.

DETAILED DESCRIPTION

Figure 2:
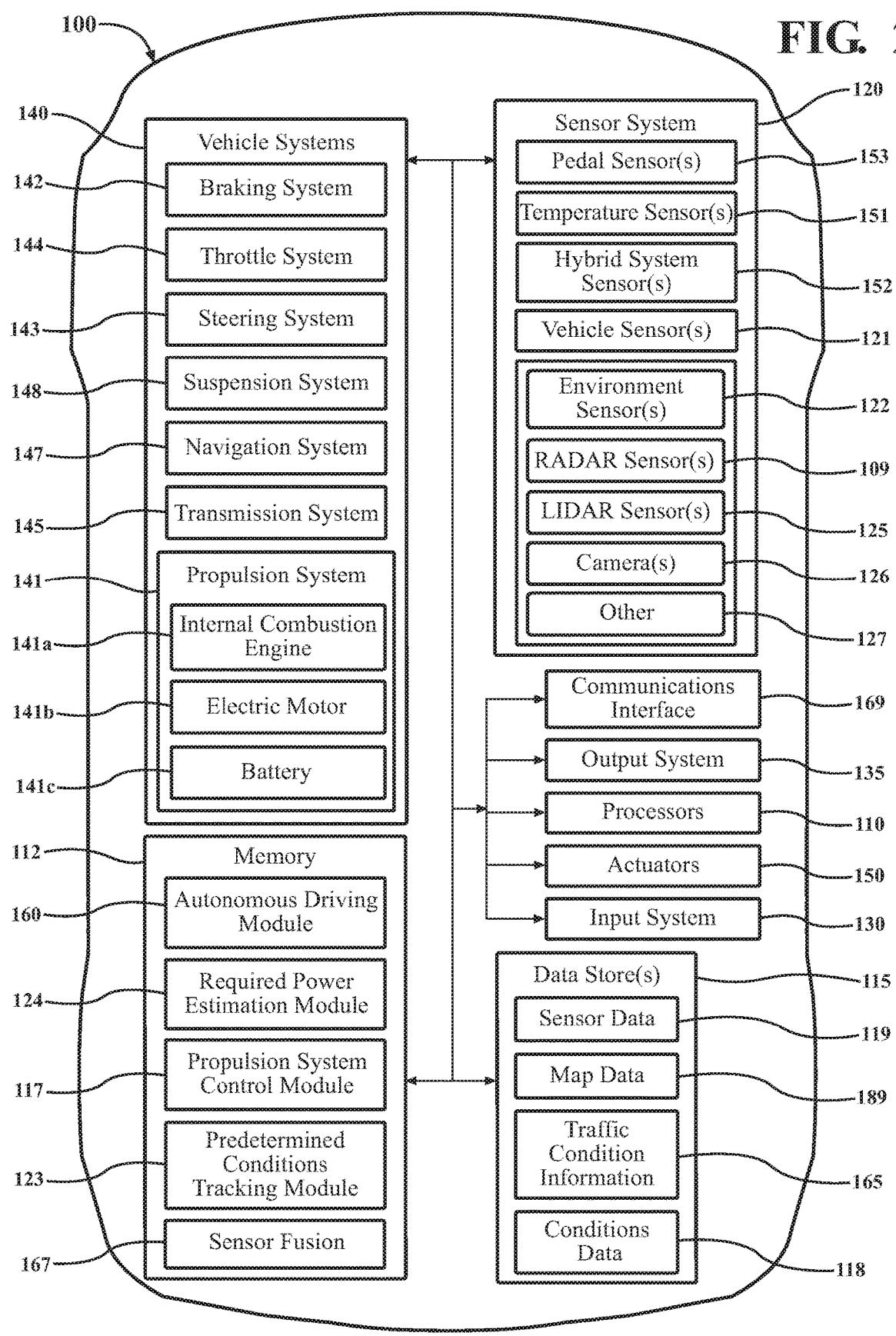
FIG. 2 is a block schematic diagram of a vehicle incorporating a system for controlling an internal combustion engine start threshold in a parallel hybrid-electric vehicle in accordance with embodiments described herein.

Embodiments described herein relate to a system for controlling an internal combustion engine start threshold in a parallel hybrid-electric vehicle. A predetermined conditions tracking module determines whether or not conditions of a plurality of predetermined conditions exist. Responsive to a determination that the conditions exist, a required power estimation module estimates a next acceleration required by the vehicle and a final power requirement for the next acceleration. A propulsion system control module determines if the estimated final power requirement is between a first amount of electric motor power available at a predetermined base engine start threshold and a second amount of electric motor power available at a predetermined elevated engine start threshold. If the estimated final power requirement is between the first and second amounts of power, operation of the vehicle is controlled so as to ensure that the engine start threshold is at the predetermined elevated threshold. The system enables the engine start threshold to be elevated when certain conditions exist, to utilize some of the power reserve available from the hybrid system battery without draining the battery excessively. This may reduce the frequency of engine starting and stopping when the vehicle is driving in stop-and-go traffic conditions.

FIGS. 1A-1C are schematic diagrams illustrating variation of an engine start threshold between predetermined limits in accordance with embodiments described herein. For purposes described herein, an internal combustion engine start threshold (or "engine start threshold") may be defined as a percentage of a maximum power available from an electric motor powered by a battery in a given state of charge (SOC). This percentage may define a point at which the internal combustion engine may be switched on to power the vehicle instead of the electric motor. Starting the engine at this power demand threshold may prevent the hybrid vehicle system battery from being excessively or completely drained by use of the electric motor to power the vehicle without using the engine. For example, for a battery state of charge of 95%, the engine start threshold may be set to 70% of the electric motor power available with the battery in this state of charge. Then, when the power demand on the electric motor reaches or exceeds the threshold, operation of the vehicle may be controlled to activate the internal combustion engine to provide power to the vehicle instead of the electric motor.

In the example shown, FIG. 1A shows the maximum power available from the electric motor for a given battery SOC. The actual value of this maximum available power may depend on or "float" with the battery SOC. If this maximum available power is used, the battery may be completely drained. FIGS. 1A-1C also show a predetermined base engine start threshold. This threshold may be a normal setting of the engine start level. The predetermined base engine start threshold may be selected based on a desired amount of reserve power to be maintained so that the battery is not completely drained. This reserve power may be represented by the area in FIGS. 1A, 1B and 1C between the predetermined base engine start threshold and the maximum available power.

FIGS. 1A, 1B and 1C also show an example of a predetermined elevated engine start threshold in accordance with embodiments described herein. This threshold may be a level to which the engine start level may be raised if all of the conditions described herein exist or are met. The predetermined elevated engine start threshold may reside between the maximum available electric motor power level and the predetermined base engine start threshold. The predetermined elevated engine start threshold may be selected based on a determination that it is acceptable to utilize at least some of the reserve power between the base engine start threshold and the maximum available power, so that the internal combustion engine does not need to be started as soon or as frequently as it would if the engine start level were maintained at the base level. The higher the predetermined elevated engine start threshold can be set, the more power will be available from the electric motor before the internal combustion engine is started.

FIG. 1B shows an engine start threshold in a configuration where a non-variable predetermined base engine start threshold is used to control the point where the internal combustion engine is started. All power above the predetermined base engine start threshold is supplied by the internal combustion engine. FIG. 1C shows a variable engine start threshold arrangement in accordance with the embodiments described herein. When the conditions described herein are determined to exist, the engine start threshold may be raised from the predetermined base engine start threshold to the predetermined elevated engine start threshold. This enables more power to be provided to the vehicle transmission from the electric motor before the internal combustion engine is started. Thus, the frequency with which the internal combustion engine is started and stopped may be reduced, particularly in cases where the vehicle 100 (FIG. 2) is in stop-and-go traffic situations.

Referring to FIG. 2, an example of a vehicle 100 is illustrated. As used herein, a "vehicle" is any form of motorized transport. In one or more implementations, the vehicle 100 is a parallel hybrid electric passenger vehicle. In this type of vehicle, both an electric motor and an internal combustion engine are operably connected to the vehicle transmission and work together to power the vehicle. In certain driving scenarios where power demands are low, the electric motor may be used as a generator to recharge the hybrid system battery. In scenarios where the power demand is sufficiently low, the vehicle may be powered by the electric motor without activating the internal combustion engine. An electronic control unit (ECU) or a propulsion system control module 117 as described herein may control operations of the electric motor and the internal combustion engine. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100.

Some of the possible elements of the vehicle 100 are shown in FIG. 2 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 2 shows a block schematic diagram of a vehicle 100 incorporating a system for controlling an internal combustion engine start threshold in a parallel hybrid-electric vehicle, in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors 109 of the sensor system 120.

The one or more data stores 115 can include conditions data 118. Conditions data 118 may include sensor data and other information (including pertinent boundary conditions, limits, and/or thresholds) pertinent to determination of the existence of any of the predetermined engine threshold-related conditions described herein. Non-limiting examples of conditions data may include speed and acceleration of the vehicle 100 as a function of time, speed and acceleration of a forward vehicle as a function of time, accelerator pedal displacement and/or position, hybrid system battery temperature, and other information. Portions of the conditions data 118 may be time-correlated (i.e., the value of a parameter measured by a sensor may be associated with a point in time at which (and/or a length of time over which) the value of the parameter occurred). Other portions of the conditions data may not be time-correlated. Elements of the conditions data 118 may be received from the vehicle sensor system 120, from other vehicle systems and/or elements, and also from extra-vehicular sources, such as cloud servers, connected vehicle, etc. (not shown). Elements of the conditions data 118 may be evaluated and/or processed by the predetermined conditions tracking module 123 (described in greater detail below) to determine whether or not each predetermined condition exists.

In one or more arrangements, the one or more data stores 115 can include map data 189. The map data 189 can include maps of one or more geographic areas. In some instances, the map data 189 can include information or data on roads, traffic control devices, road markings, structures, features of interest, and/or landmarks in the one or more geographic areas. The map data 189 can be in any suitable form. In some instances, the map data 189 can include aerial views of an area. In some instances, the map data 189 can include ground views of an area, including 360-degree ground views. The map data 189 can include measurements, dimensions, distances, and/or information for one or more items included in the map data 189 and/or relative to other items included in the map data 189. The map data 189 can include a digital map with information about road geometry, road grades and slopes, and other road information, including information about the road on which the vehicle 100 is currently traveling. The map data 189 can be high quality and/or highly detailed. In one or more arrangements, the map data 189 may be updated continuously (i.e., as soon as information relating to revisions becomes available) or regularly from a cloud source or other source exterior of the vehicle.

The data stores 115 may store traffic condition information 165 describing traffic conditions on the road on which the vehicle 100 is traveling. Traffic condition information 165 may include navigational coordinates of particular events or conditions (such as collisions, stoppages, construction areas, congestion, areas of stop-and-go driving etc.), an associated descriptor or classifier describing the nature of the condition, and other pertinent information.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 2).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environment sensor data. Sensor system 120 may include sensors configured to detect the current state or status of vehicle systems and components and to generate indications (for example, using trouble codes) possible malfunctions of vehicle systems and components. The existence of the various predetermined conditions described herein may be calculated or otherwise determined using sensor data.

Sensors of the sensor system 120 may include (or be operably connected to) one or more timers or clocks (not shown) configured to enable acquisition, tracking, storage, generation and/or processing of time-correlated sensor data. That is, data acquired by the sensors described herein may be monitored and recorded over one or more predetermined time periods to determine time-related variations in the parameters monitored by the sensors. This time-correlated data may be used as described herein to aid in determining the existence of conditions required for the elevation and lowering of the engine start threshold.

The sensor system 120 can include one or more vehicle sensors 121. The vehicle sensor(s) 121 can detect, determine, and/or sense information about the vehicle 100 itself and/or any occupants inside the vehicle. The vehicle sensor(s) 121 may include sensors configured to detect conditions and/or events inside the vehicle interior or occupant compartment. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The vehicle sensor(s) 121 may include temperature sensor(s), including temperature sensor(s) 151 configured to measure temperature(s) of hybrid system elements such as the battery 141$c$. The vehicle sensor(s) 121 may include one or more hybrid system component status sensors 152, including sensor(s) configured to measure and track a state of charge (SOC) of the hybrid system battery 141$c$ and sensors for detecting (or providing data enabling determination of) power demands on the electric motor 141$b$ as a function of time. The vehicle sensor(s) 121 may include pedal sensor(s) 153 configured to measure the positions, displacements, and time rates of change of positions of the accelerator and brake pedals. The vehicle sensor(s) 121 may include sensors and other elements and/or systems directed to measuring or estimating the mass of the vehicle 100 and a "road load" on the vehicle. These parameters relate to the power needed for the vehicle to achieve a next estimated acceleration.

The sensor system 120 can include one or more environment sensors 122 configured to acquire data of at least a portion of the external environment of the vehicle 100 (e.g., nearby objects). The environment sensors 122 may detect data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, other vehicles, etc. As an example, in one or more arrangements, the environment sensors 122 can include one or more radar sensors 109, one or more LIDAR sensors 125, one or more cameras 126, and/or other types of sensors 127. Environment sensors 122 may be configured to detect aspects of road geometry, road grade/slope, traffic conditions, movements and characteristics of other vehicles, and other external events and conditions.

Environment sensors such as radar 109, LIDAR 125, camera(s) 126, and/or other sensors may also be usable to monitor the speed, acceleration, position, and other characteristics of a forward vehicle and/or any other vehicle in close proximity to the vehicle 100. A "forward vehicle" may be another vehicle driving immediately in front of the vehicle 100 in the same lane. Environment sensors 122 may be configured to detect activation and deactivation of turn signals, brake lights, and other signals mounted on other vehicles or along a road. Environment sensors 122 may be configured to detect the presence of traffic control elements such as traffic lights, signage, etc., and to interpret and process any indications or messages conveyed by such elements.

Referring again to FIG. 2, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. Information such as sensor data, traffic information, road condition information, weather information, and other types of information may be transmitted and received via the communications interface 169. If required, wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. The vehicle 100 can also include an output system 135. An "output system" includes any device, component, or arrangement or groups thereof that enable information/data to be presented to a vehicle occupant (e.g., a driver, a vehicle passenger, etc.) or a remote user.

The vehicle 100 can include one or more vehicle systems, collectively designated 140. Various examples of the one or more vehicle systems 140 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The propulsion system 141 may include an internal combustion engine 141a, an electric motor 141b, and one or more hybrid system batteries 141c for powering the electric motor 141b. Both the electric motor 141b and the engine 141a may be operably connected to the transmission system 145 so that both (or either) the motor 141b and engine 141a may provide power to the transmission. The propulsion system 141 may include hardware and/or software elements enabling the electric motor 141b to operate as a generator under certain conditions, to charge the battery 141c. The propulsion system 141 may also include other elements. Elements of the propulsion system 141 may be operably connected to the propulsion system control module 117 and other modules and/or vehicle systems and components configured to control (or assist in controlling) operations of the propulsion system 141.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system. The navigation system 147 may be configured to track the path of a vehicle along a travel route. The navigation system 147 may be configured to operate in conjunction with the autonomous driving module to guide the vehicle along a travel route selected by a user.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities.

In embodiments described herein, a memory 112 may store an autonomous driving module 160, a predetermined conditions tracking module 123, a required power estimation module 124, and a propulsion system control module 117. The memory 112 is a random-access memory (RAM), read-only memory (ROM), a hard-disk drive, a flash memory, or other suitable memory for storing the modules 160, 123, 124, and 117. The modules 160, 123, 124, and 117 are, for example, computer-readable instructions that when executed by the processor 110, cause the processor(s) 110 to perform the various functions disclosed herein. Additional modules (not shown) may also be stored in memory 112.

The vehicle 100 can include one or more modules, at least some of which are described herein. The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the user vehicle so as to drive the vehicle along a travel route, from an initial or start location to a destination.

The processor(s) 110, the autonomous driving module 160, the conditions tracking module 123, the required power estimation module 124, the propulsion system control module 117 and/or other modules described herein can be operably connected to communicate with each other and with the other elements of the vehicle, including various vehicle systems 140 and/or individual components thereof. For example, referring to FIG. 2, the processor(s) 110 and the autonomous driving module(s) 160 can be in communication to send and/or receive information from the various vehicle systems 140 to control the movement, speed, maneuvering, heading, direction, etc. of the vehicle 100. The processor(s) 110, the autonomous driving module(s) 160, the propulsion system control module 117 and/or other elements of the vehicle may control some or all of the vehicle systems 140 and, thus, may be partially or fully autonomous.

The processor(s) 110, the autonomous driving module(s) 160, and the navigation system 147 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels).

The vehicle 100 can include a predetermined conditions tracking module 123. The predetermined conditions tracking module 123 may include computer-readable instructions that when executed by the one or more processor(s) 110 cause the one or more processor(s) to continuously determine whether or not conditions of a plurality of predetermined conditions exist. "Continuous" determination of the existence/non-existence of a condition means determination of the existence/non-existence of the condition as soon as possible after the condition comes into existence or ceases to exist, given the availability of sensor data, information processing time, etc. These determinations may be made constantly during operation of the vehicle 100.

The existence/non-existence of a particular condition may be determined using sensor data, computer-executable logic, and/or any other pertinent information. For some conditions, the existence of the condition may be readily determined using data from a single sensor. To determine the existence/non-existence of other conditions, data from multiple sensors may need to be processed and interpreted and/or two or more sub-conditions may need to be satisfied for the main condition to be present. The predetermined conditions tracking module 123 may be configured to operate in communication with the processor(s) 110, with sensor fusion algorithm 167, and/or with any other element or elements of the vehicle 100 to determine and monitor the existence/non-existence of the predetermined engine start threshold modification conditions as described herein.

In one or more arrangements, existence of each of the predetermined conditions may be necessary for the internal combustion engine start threshold to be elevated from a base engine start threshold to an elevated engine start threshold as described herein. Similarly, if any of the predetermined conditions do not exist, then the engine start threshold may not be elevated from the base engine start threshold. Also, if each of the predetermined conditions exist when the engine start threshold is elevated but subsequently one or more of the predetermined conditions ceases to exist, the engine start threshold may be lowered from the elevated state to the base engine start threshold.

The predetermined conditions tracking module 123 may be configured to determine or detect when a previously existing condition no longer exists (i.e., the "non-existence" of the condition). In one or more arrangements, the predetermined conditions tracking module 123 may be configured to generate alert signals to other elements of the vehicle (for example, the propulsion system control module) when conditions that did not exist come into existence and when a previously existing condition no longer exists. In one or more arrangements, the predetermined conditions tracking module 123 may maintain a status flag for each condition indicating whether or not the condition currently exists.

The predetermined conditions used for control of the engine start threshold may include driver learning conditions. In one or more arrangements, the driver learning conditions may include a condition where the vehicle 100 has completed at least a specific number of consecutive speed variation cycles within a predetermined time period, with each speed cycle including exceeding a predetermined upper limit speed $S_U$ followed by falling below a predetermined lower limit speed $S_L$ before rising again above the upper limit speed. An example of this condition is illustrated in FIG. 3, which shows completion of two such speed variation cycles within a period of 35 seconds. FIG. 3 shows a "start" point of a first speed variation cycle (when the speed exceeds the upper speed limit $S_U$) followed by an "end" point of the first speed variation cycle (when the speed falls below the lower speed limit $S_L$). The "start" of the second speed variation cycle occurs the next time the speed exceeds the upper speed limit, and the "end" of the second speed variation cycle occurs the next time the speed falls below the lower limit. The specific number of cycles must occur within the predetermined time period for the condition to exist. In the example shown, the predetermined upper limit speed is 20 mph and the predetermined lower limit speed is 10 mph. This type of variation in speed over a relatively short period of time may be indicative of the type of stop-and-go traffic condition in which control of the engine start threshold is meant to be utilized. In particular arrangements, the completion of at least three speed variation cycles is necessary for this condition to exist.

A predetermined condition as described herein may be time related or non-time related. Each time-related predetermined condition may be associated with a predetermined time period over which a parameter of the condition may be measured to determine existence or non-existence of the condition. One example of a time-related predetermined condition is the condition just described where the vehicle 100 has completed a specific number of consecutive speed variation cycles within an associated predetermined time period.

The predetermined time period associated with a given condition may be a specified length of time (for example, 30 seconds). For example, sensors may detect when the vehicle 100 first exceeds the upper limit speed (i.e., a "trigger event" for measurement of this predetermined condition) and a timer may be started at or about this time. As the sensors continue to monitor the vehicle 100, the sensor data may be analyzed (using sensor fusion algorithm 167, predetermined conditions tracking module 123, processors 110, and/or other vehicle elements) to determine if the vehicle 100 completes the required number of consecutive speed variation cycles within the predetermined time period beginning from the time at which the timer was started. If the associated predetermined time period passes without the vehicle 100 completing the required number of consecutive speed variation cycles, the associated predetermined condition may be determined not to exist. Then the timer may be reset and started again the next time a trigger event occurs. In this manner, existence of the predetermined condition may be detected as soon as it occurs through constant sensor monitoring of the vehicle 100.

A predetermined time period used for the time-dependent conditions described herein may be any desired time period. The predetermined time periods associated with different time-dependent conditions may be independent of each other (i.e., the time periods over which different parameters are measured need not overlap in time or relate to the same span of time). Thus, the time periods over which different parameters are measured may begin and/or end at different times.

In one or more arrangements, the predetermined time periods used for different time-dependent conditions may be equal. In other arrangements, the predetermined time periods used for two or more different conditions may differ from each other. As one possible example of how the predetermined conditions tracking module 123 may operate in cases where the predetermined time periods used for two or more conditions differ from each other, if a first condition exists at the end of its associated time period, the conditions tracking module may determine or "flag" that the condition exists for purposes of adjusting the engine start threshold. The predetermined conditions tracking module 123 may then continue to measure other time-related conditions, while continuing to monitor the status of the first condition. If the other conditions exist at the ends of their respective measurement time periods and if the first condition still exists when the measurement time periods are up for the other conditions, the conditions tracking module may determine that both the first condition and the other conditions exist. As soon as all of the predetermined conditions exist, and as soon as any other necessary requirements (for example, an estimated power requirement for the vehicle next acceleration) for adjusting the engine start threshold are available, the engine start threshold may be raised from the predetermined base engine start threshold to the predetermined elevated engine start threshold as described herein. Similarly, as long as the predetermined conditions continue to exist, the engine start threshold may remain at the elevated level.

If any predetermined condition ceases to exist while the engine start threshold is elevated, the engine start threshold may be lowered back to the base engine start threshold. In this case, if the condition is a time-related condition (for example, the previously-described completion of the speed variation cycles of the driver learning conditions), a new measurement time period for the base condition element may start as soon as a trigger event for the predetermined condition is detected. For example, in the case of the speed variation cycles discussed above, the trigger event condition element may be the vehicle 100 exceeding the upper limit speed. A new time period may start as soon as the vehicle 100 exceeds the upper limit speed. The predetermined conditions tracking module may then monitor the vehicle speed for the predetermined time period to determine if the required number of speed variation cycles occur within the time period. If the required number of speed variation cycles occurs within the predetermined time period, the predetermined conditions tracking module may determine that this predetermined condition once again exists.

These procedures may be performed repeatedly and continuously to enable the engine start threshold to be raised as soon as all predetermined conditions exist and to be maintained as long as these conditions exist. These procedures may also help ensure that the engine start threshold is lowered to the base engine start threshold when any of the predetermined conditions no longer exist, and help ensure that the engine start threshold remains at the base engine start threshold until all the predetermined conditions exist for elevating the engine start threshold.

In one or more arrangements, the driver learning conditions include a condition where a maximum speed of the vehicle 100 during the predetermined time period is always less than a predetermined maximum allowable speed. FIG. 4 shows an example of such a condition. FIG. 4 is a graph showing a time rate of change of speed and acceleration of the vehicle 100 over a predetermined time period. In the example shown, the speed of the vehicle 100 does not exceed a predetermined maximum allowable speed of 16 mph over a predetermined time period of 20 seconds.

In one or more arrangements, the driver learning conditions include a condition where a maximum acceleration of the vehicle 100 during the predetermined time period is always less than a predetermined maximum allowable acceleration. FIG. 4 shows an example of such a condition. In the example shown, the acceleration of the vehicle 100 does not exceed a predetermined maximum allowable acceleration of 3 ft./sec$^2$ over a predetermined time period of 20 seconds.

Figure 6:
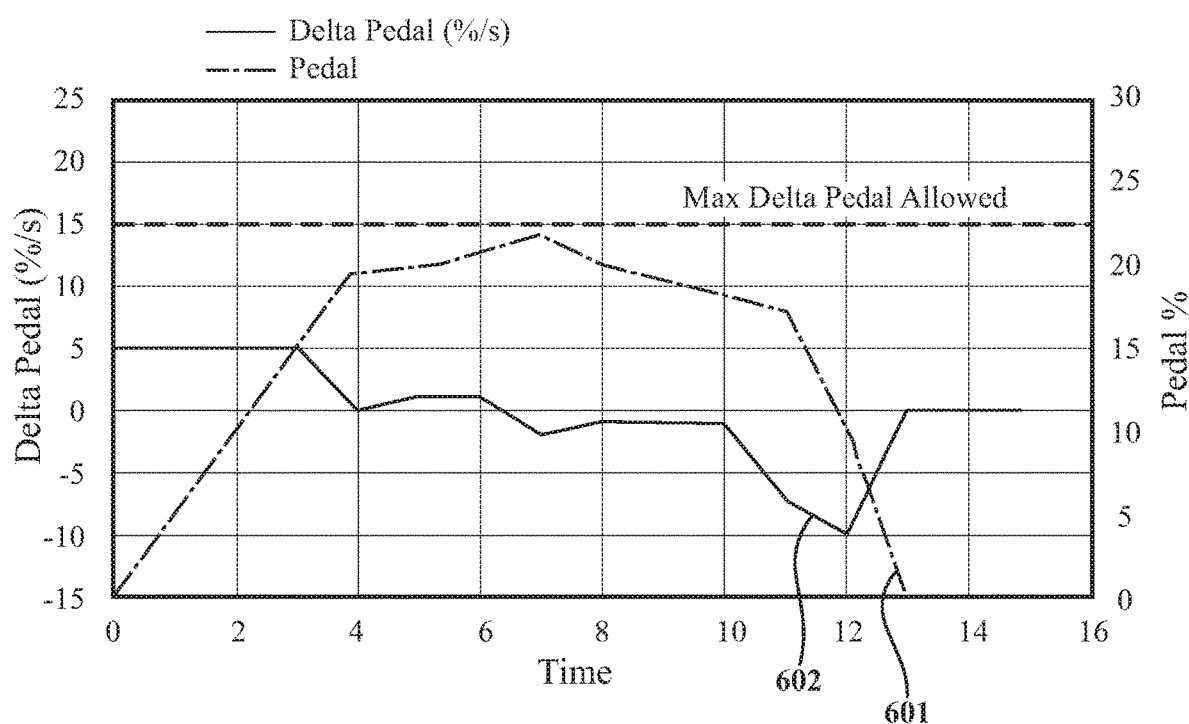
FIG. 6 is a schematic representation of a condition where a delta pedal of a vehicle remains below a predetermined threshold for a predetermined time period.

In one or more arrangements, the driver learning conditions include a condition where a delta pedal of the vehicle 100 remains below a predetermined threshold for a predetermined time period. An example of this condition is shown in FIG. 6, which illustrates an accelerator pedal position over time with respect to a reference position of the pedal (line 601) and rate of change of the pedal position ("delta pedal", line 602) for an exemplary driving scenario. The pedal percentage shown FIG. 6 refers to a movement of the vehicle 100 accelerator pedal as a percentage of the available pedal stroke length. A greater delta pedal (i.e., a more rapid application of the accelerator pedal) may be indicative of a higher power demand on the hybrid system battery (calling for a greater rate of vehicle acceleration). If the delta pedal exceeds a certain threshold value at any time during the predetermined time period, it may be assumed that the driver is relatively aggressive in operation of the accelerator pedal in a stop-and-go driving scenario or that situations calling for a sudden, relatively more rapid acceleration may be warranted in the current driving scenario. In such a case where the delta pedal does not remain below the threshold, the "delta pedal" condition nay be considered not to exist. Consequently, the propulsion system control module 117 may forego raising of the engine start threshold from the predetermined base engine start threshold or, if the engine start threshold has already been raised, the propulsion system control module may automatically lower the engine start threshold to the predetermined base engine start threshold.

Figure 7:
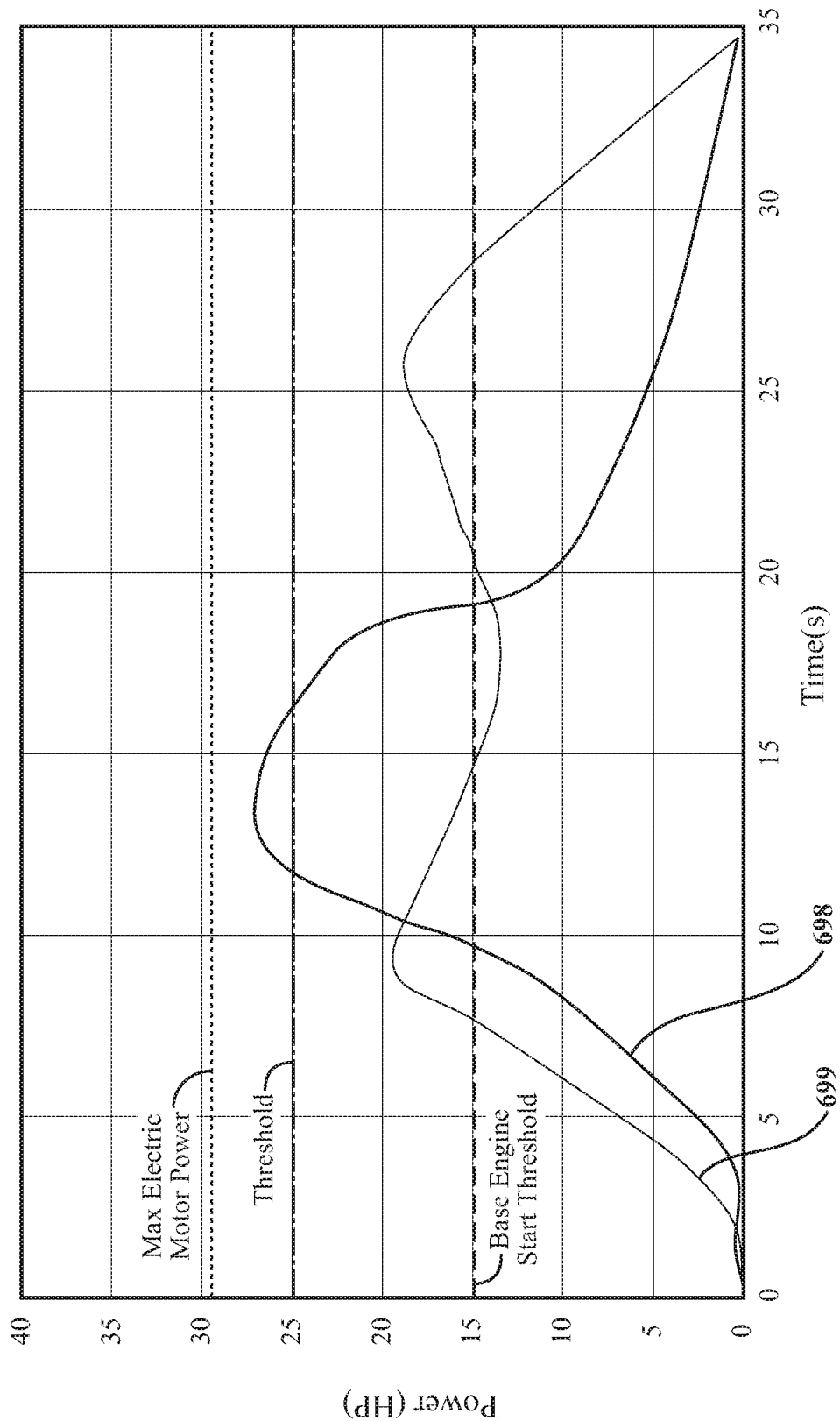
FIG. 7 is a schematic representation of a condition where a power demand on an electric motor of a hybrid vehicle remains below a predetermined threshold during a predetermined time period.

In one or more arrangements, the driver learning conditions may include a condition where a power demand on the electric motor 141b during the predetermined time period has been constantly below a predetermined threshold. An example of this condition is illustrated by line 699 shown in FIG. 7, which shows the power demand on the electric motor remaining below the threshold of 25 HP during a predetermined time period of 35 seconds. Thus, at the end of the predetermined time period and based on line 699, the predetermined condition of a power demand on the electric motor being constantly below the threshold would be considered to exist. In contrast, line 698 shows a case where the power demand on the electric motor exceeds the threshold during the predetermined time period. Thus, at the end of the predetermined time period and based on line 698, the predetermined condition of a power demand on the electric motor being constantly below the threshold would be considered to not exist. In one or more arrangements, the predetermined power demand threshold of FIG. 7 may be a calculated power demand during a worst case engine start shock condition caused by driving torque demand on the electric motor during acceleration while the internal combustion engine is stopped.

In accordance with the above discussion, parameters of the driver learning conditions may include the speed of the vehicle 100, the acceleration of the vehicle 100, the predetermined time period, power demand, delta pedal, and/or any other variables or parameters which are detected, evaluated, calculated and/or determined in determining the existence/non-existence of the driver learning conditions.

The predetermined conditions used for control of the engine start threshold may also include environment learning conditions. In one or more arrangements, certain of the environment learning conditions may be the same as (or similar to) one or more of the driver learning conditions.

In one or more arrangements, the environment learning conditions may include a condition where a forward vehicle has completed at least a specific number of consecutive speed variation cycles within a predetermined time period, with each speed cycle including exceeding a predetermined upper limit speed followed by falling below a predetermined lower limit speed before rising again above the upper limit speed. This may be the same type of condition as previously described with respect to the driver learning conditions, and as illustrated in FIG. 3. In one or more arrangements, the environment learning conditions include a condition similar to that previously described with respect to FIG. 4. In this condition, a maximum speed of the forward vehicle during the predetermined time period is always less than a predetermined maximum allowable speed. In one or more arrangements, the environment learning conditions include a condition in which a maximum acceleration of the forward vehicle during the predetermined time period is always less than a predetermined maximum allowable acceleration. This condition is similar to that previously described with respect to FIG. 4.

Referring to FIG. 5, in one or more arrangements, the environment learning conditions may include a condition where a mirroring coefficient of the vehicle 100 is less than a predetermined value over an associated predetermined time period. The mirroring coefficient may be calculated by determining the maximum acceleration of the forward vehicle during the predetermined time period and the maximum acceleration of the vehicle 100 during the predetermined time period, in response to the forward vehicle acceleration. Then a ratio of the maximum acceleration of the vehicle 100 to the maximum acceleration of the forward vehicle is taken to provide the mirroring coefficient. Ideally, the acceleration of the vehicle 100 will "mirror" or closely follow the acceleration of the forward vehicle as the vehicle 100 follows the forward vehicle during a stop-and-go driving scenario. If the acceleration ratio is too high, this may indicate that the vehicle 100 is following the forward vehicle too aggressively (i.e., a driver of the vehicle 100 is accelerating and decelerating to rapidly in response to stop-and-go movements of the forward vehicle). Under these conditions, the propulsion system control module 117 may not raise the engine start threshold.

An example of the mirroring coefficient is shown in FIG. 5, which illustrates the speed and acceleration of a forward vehicle and the vehicle 100 in an exemplary situation. In the example shown, the maximum acceleration of the forward vehicle is about 2.0 m/sec$^2$ while the maximum responsive acceleration of the vehicle 100 is about 2.1 m/sec$^2$. Thus, the ratio of the maximum acceleration of the vehicle 100 to the maximum acceleration of the forward vehicle in the example is 2.1/2.0 or about 1.05. The acceleration of the forward vehicle may be determined from vehicle 100 radar/LIDAR sensor data, while the acceleration of the vehicle 100 may be obtained from vehicle 100 IMU data, speedometer data or data from other vehicle sensor(s). In particular arrangements, the ratio of the maximum acceleration of the vehicle 100 to the maximum acceleration of the forward vehicle must be below 1.25 for the pertinent condition to exist.

Figure 8:
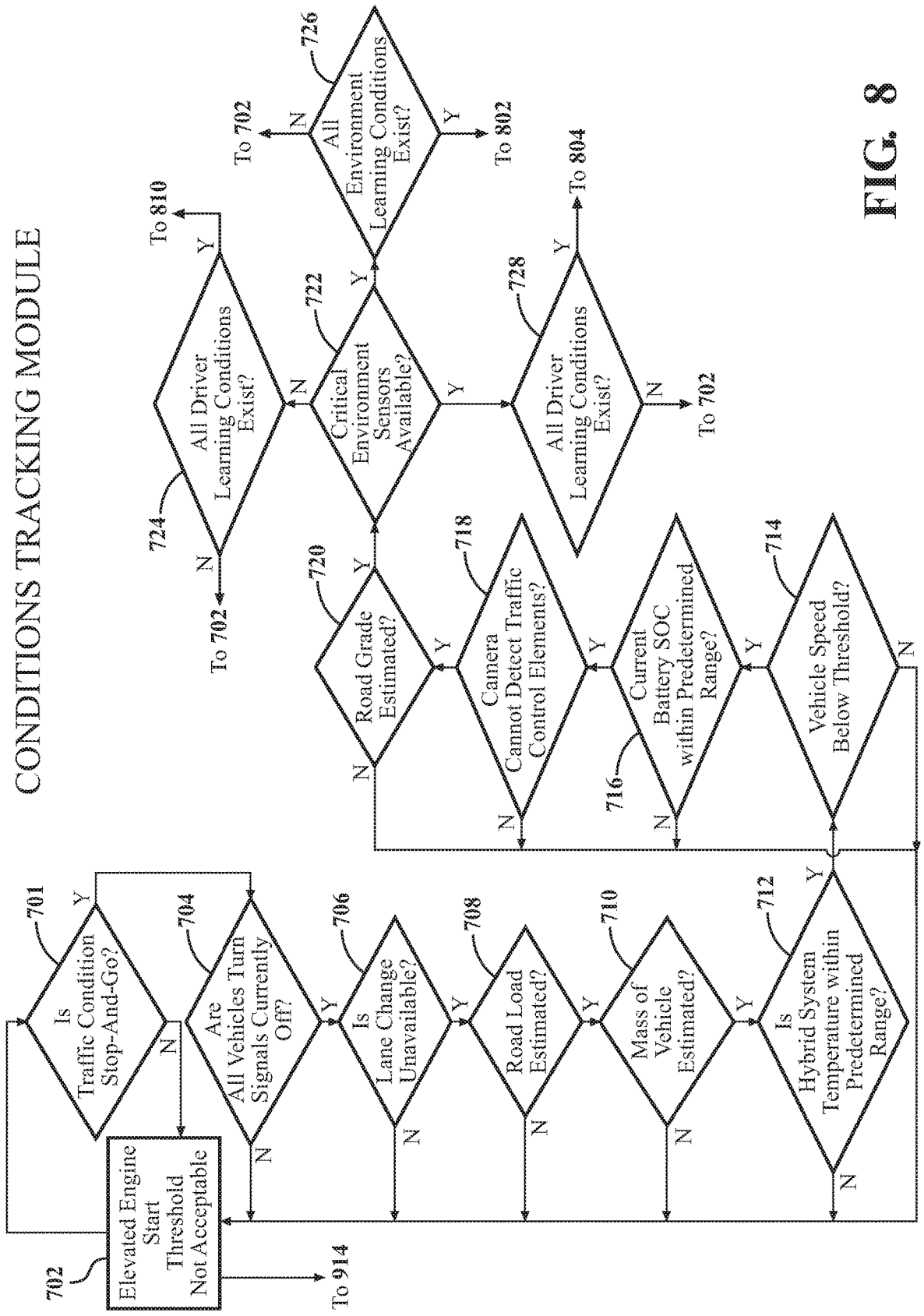
FIG. 8 is a flow diagram illustrating an operating mode of a predetermined conditions tracking module in accordance with an embodiment described herein.

FIG. 8 is a flow diagram illustrating an operating mode of the predetermined conditions tracking module 123 in accordance with an embodiment described herein. FIG. 8 illustrates determination of the existence/non-existence of various conditions which may be used for control of the engine start threshold, as described herein. The predetermined conditions tracking module 123 may include computer-readable instructions that when executed by the one or more processors cause the one or more processors to continuously determine the existence and non-existence of each condition of a plurality of predetermined conditions. The plurality of predetermined conditions may include the conditions discussed below and which are shown in FIG. 8. Optionally, other predetermined conditions may be incorporated. The predetermined conditions tracking module 123 may be configured to constantly monitor the status (i.e., "existing" or "non-existing") of each of the predetermined conditions. By default, if a condition does not exist, it may be considered "non-existing". The system for controlling the engine start threshold may require that one or more of the conditions shown in FIG. 8 exist in order for the engine start threshold to be raised from the predetermined base engine start threshold to the predetermined elevated engine start threshold.

In one or more arrangements, the system for controlling the engine start threshold may require that all of the predetermined conditions (including any associated sub-conditions) exist simultaneously in order for the engine start threshold to be raised from the predetermined base engine start threshold to the predetermined elevated engine start threshold. Similarly, in one or more arrangements, the system for controlling the engine start threshold may require that all of the predetermined conditions (including any associated sub-conditions) exist simultaneously in order for the engine start threshold to be maintained at the predetermined elevated engine start threshold. Thus, if any of the predetermined conditions (including any associated sub-conditions) do not exist, the engine start threshold may not be raised. Also, if any of the predetermined conditions (including any associated sub-conditions) cease to exist with the engine start threshold already at the raised level, the engine start threshold may be lowered from the predetermined elevated engine start threshold to the predetermined base engine start threshold.

Although FIG. 8 implies that the conditions shown are evaluated in sequence, the conditions shown may actually be constantly evaluated independently of each other and in parallel with each other. Thus, for example, evaluation of the conditions does not necessarily begin with block 701 ("stop-and-go traffic condition") and does not necessarily proceed in the linear manner shown. The conditions may be evaluated and their statuses updated on an ongoing basis based on the latest pertinent information, so that a condition status change is determined and incorporated into the decision-making process as soon as possible.

Referring to block 701, the predetermined conditions used for control of the engine start threshold may also include a stop-and-go driving condition. The existence of the stop-and-go driving condition may be determined by determining the existence of one or more sub-conditions which may be indicative of the stop-and-go driving condition. Possible sub-conditions may include situations where, for example, the vehicle speed is currently below a certain threshold, the vehicle speed has remained below the threshold for at least a predetermined period of time, the magnitude and/or rate of change of accelerator pedal displacement are below certain thresholds for at least a predetermined period of time, the magnitude and/or rate of change of brake pedal displacement are below certain thresholds for at least a predetermined period of time, where data from a forward-looking radar sensor of the vehicle 100 indicates that a forward vehicle is stopped or has a history of below a certain threshold speed over a certain period of time, and where information from a cloud server or other extra-vehicular source indicates that traffic in the vicinity of the vehicle 100 is congested. Any of the above factors may be evaluated according to associated criteria to determine whether or not a stop-and-go traffic condition exists. Also, sensor data relating to two or more of the above factors may be processed (using the sensor fusion algorithm 167, for example) to determine if traffic conditions proximate the vehicle 100 may be categorized as "stop-and-go".

If the stop-and-go driving condition in block 701 is determined to exist, control may proceed as shown to the evaluation of the remaining conditions to determine if they also exist. If the condition in block 701 does not exist, control may pass to block 702 where the predetermined conditions tracking module may determine that elevating the engine start threshold is unacceptable. In this manner, each of the conditions in blocks 701, 704, 706, 708, 710, 712, 714, 716, 718, and 720 described herein may be evaluated and monitored constantly and in no particular order. If any of these conditions are determined to not exist, control may pass to block 702. The predetermined conditions used for control of the engine start threshold may also include a condition 704 where all turn signals of the vehicle 100 are currently turned off. Activation of any of the vehicle turn signals may be taken as an indication that a lane change may be attempted by the vehicle 100. A lane change may require a temporarily higher power demand, especially if more aggressive driving is needed to execute the lane change. Thus, the base engine start threshold may be maintained to meet any sudden, additional power requirement during a lane change.

The predetermined conditions used for control of the engine start threshold may also include a condition 706 where a lane change option is not available for the vehicle 100. That is, this condition exists when the vehicle 100 does not have a lane change option at the time the condition is evaluated. If a lane change option is unavailable at the time the condition is evaluated, it may be assumed that no sudden additional power will be required for a lane change. In this case, the engine start threshold may be adjusted. However, if a lane change option is available at the time the condition is evaluated, the start threshold may be maintained at the base threshold to allow additional power to be required if needed in the event a human driver or the autonomous driving module executes a lane change. The availability of a lane change option for the vehicle 100 may be determined from environment sensor data. For example, environment sensors 122 may be configured to detect other vehicles in the vicinity of the vehicle 100 and gaps between the other vehicles in adjacent lanes. The sensor fusion algorithm 167 may be configured to determine from sensor data whether or not the vehicle 100 could change lanes if needed, given the speeds of the vehicle 100 and any other vehicles in adjacent lanes, the spacing(s) between other vehicles in adjacent lanes, and other pertinent factors.

The predetermined conditions may also include a condition where a mass of the vehicle 100 has been estimated or determined. The necessary predetermined conditions may also include a condition where a road load on the vehicle 100 has been estimated or determined. The vehicle mass and road load may be determined using any suitable method or methods. In one or more arrangements, the vehicle mass and road load may be determined using methods and systems set forth in U.S. Published Patent Appln. No. 2019/0039595 ('the '595 application), the disclosure of which is incorporated herein by reference in its entirety except for any definitions, subject matter disclaimers or disavowals set forth therein to the extent that the incorporated material is inconsistent with the express disclosure herein, in which case the language in this disclosure controls. The vehicle 100 may also incorporate and/or be in communication with any sensors (for example, a 3-axis accelerometer) or other components and/or systems required to estimate or determine the vehicle mass and road load as described in the '595 application. Alternative methods of estimating or determining the vehicle mass and road load may also be employed.

The predetermined conditions used for control of the engine start threshold may also include a condition 712 which exists when a temperature of the hybrid vehicle system battery is determined to be within a predetermined range. The necessary predetermined conditions may also include a condition where a state of charge (SOC) of the hybrid vehicle system battery 141$c$ is determined to be within a predetermined range. The predetermined conditions used for control of the engine start threshold may also include a condition 714 which exists when a speed of the vehicle 100 is below a predetermined threshold. That is, if the speed of the vehicle 100 is below the predetermined threshold when all of the other predetermined conditions exist, elevation of the engine start threshold may be considered acceptable.

The predetermined conditions used for control of the engine start threshold may also include a condition 716 which exists when a battery state of charge (SOC) is currently within a predetermined range. The predetermined conditions used for control of the engine start threshold may also include a condition 718 which exists when a traffic control element is not detectible by a camera of the vehicle 100. A traffic control element may be any device or mechanism directed to controlling a flow of traffic on a road on which the vehicle 100 is driving. Examples of traffic control elements include traffic lights and signage. This condition may aid in distinguishing stop-and-go driving conditions (in which vehicle movement may be unpredictable and opportunistic) from planned traffic control conditions where traffic flow is regulated at specific locations such as intersections, off-ramps, etc.

The predetermined conditions used for control of the engine start threshold may also include a condition 720 which exists when a grade of a road on which the vehicle 100 is traveling has been estimated or determined. The road grade or slope may be determined using any suitable method, for example, using vehicle sensor data of by reference to map data.

Referring to FIG. 8, if all of the conditions other than the driver learning conditions and the environment learning conditions (i.e., the conditions in blocks 701, 704, 706, 708, 710, 712, 714, 716, 718, and 720) have been tested and found to exist, control may pass to block 722, where the predetermined conditions tracking module may determine if all sensors critical to determination of the existence of the environment learning conditions are present and active. If all sensors necessary for determination of the existence of the environment learning conditions are not present and/or active, the predetermined conditions tracking module 123 may be unable to determine whether or not all environment conditions exist. For such cases, in one or more arrangements, the predetermined conditions tracking module 123 may omit the use of the previously-described environment learning conditions as criteria for determining whether the engine start threshold can be elevated. In this case, control may transfer to block 724, where the predetermined conditions tracking module 123 may determine whether or not all of the previously-described driver learning conditions exist. If all of the driver learning conditions do not exist, control may pass to block 702 where the predetermined conditions tracking module may determine that elevating the engine start threshold is unacceptable. However, if all of the driver learning conditions exist, control may transfer to block 810 (FIG. 9, described in greater detail below).

Returning to block 722, if all sensors critical to determination of the existence of the environment learning conditions are present and active, control may proceed to blocks 726 and 728. In block 726, the predetermined conditions tracking module 123 may determine whether or not all environment learning conditions exist. If all of the environment learning conditions do not exist, control may pass to block 702 where the predetermined conditions tracking module 123 may determine that elevating the engine start threshold is unacceptable. However, if all of the environment learning conditions exist, control may pass to block 802 (FIG. 9). In block 728, the predetermined conditions tracking module 123 may determine whether or not all driver learning conditions exist. If all of the driver learning conditions do not exist, control may pass to block 702 where the predetermined conditions tracking module 123 may determine that elevating the engine start threshold is unacceptable. However, if all of the driver learning conditions exist, control may pass to block 804 (FIG. 9).

In the manner just described, the existence/non-existent of the predetermined conditions may be continuously determined and the results forwarded to the required power estimation module 124 and the propulsion system control module 117. This enables the engine start threshold to be continuously updated.

Figure 9:
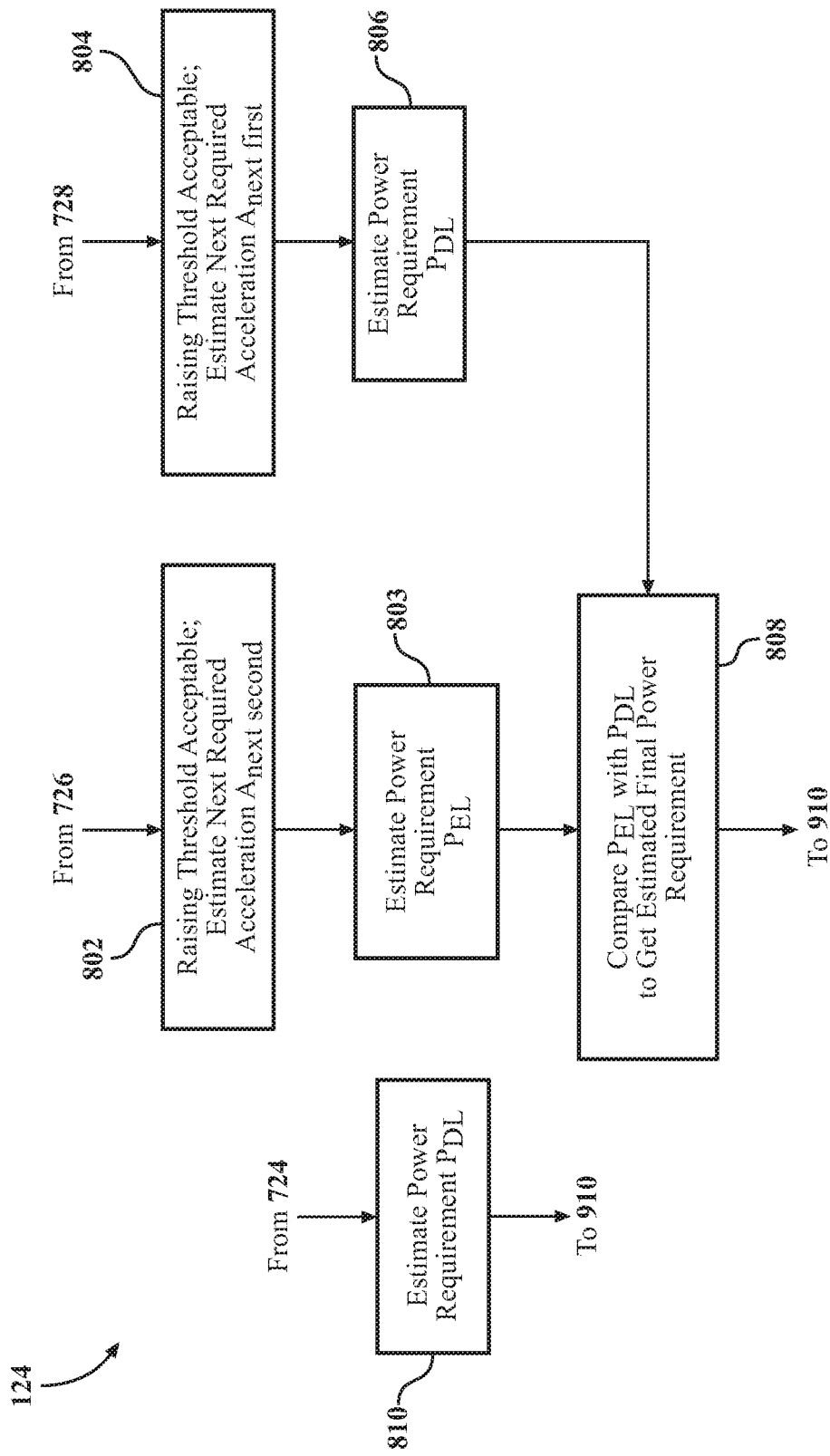
FIG. 9 is a flow diagram illustrating an operating mode of a required power estimation module in accordance with an embodiment described herein.

FIG. 9 is a flow diagram illustration of an operating mode of the required power estimation module 124 in accordance with an embodiment described herein. Referring to FIG. 9, responsive to determinations by the predetermined conditions tracking module that the predetermined conditions exist, the required power estimation module may estimate a next acceleration required by the vehicle. The next acceleration of the vehicle may be an acceleration projected to be required by the vehicle for its next move forward after the vehicle has been stopped or slowed in a stop-and-go traffic condition. This acceleration may be applied by the electric motor supplying power to the vehicle transmission.

In block 804, following a determination in block 728 of FIG. 8 that the driver learning conditions exist, the required power estimation module 124 may generate a first estimate $A_{next\,first}$ of the next acceleration required by the vehicle. In one or more arrangements, the first estimate $A_{next\,first}$ of the next acceleration may be determined with reference to the graph of FIG. 4. The first estimate of the next acceleration may be taken as the maximum acceleration $A_{max}$ of the vehicle 100 during the time period shown in the graph.

In block 806, the required power estimation module 124 may, using the first estimate of the next acceleration $A_{next\,first}$, generate an estimate of the power requirement $P_{DL}$ for the first estimate of the next acceleration $A_{next\,first}$. A total force $F_{DL}$ required to move the vehicle 100 at the first estimate of the next acceleration $A_{next\,first}$ may be calculated using the following relationship:

$$F_{DL}=(A_{next\,first}*M)+F_{roadload}+F_{grade}$$

where M=the mass of the vehicle, $F_{roadload}$=the road load, and $F_{grade}$=a component of the total force required to overcome the road grade. The road grade or slope may be determined using any suitable method, for example, using vehicle sensor data or by reference to map data. In measuring vehicle acceleration in a horizontal direction, a vehicle accelerometer value of acceleration will be affected by the road grade. Thus, in particular arrangements, the road grade may be estimated mathematically by determining a difference between vehicle acceleration as measured using an accelerometer and an acceleration calculated using the speed of vehicle tire rotation. An estimate of $F_{grade}$ may then be obtained using $F_{grade}$=M*g (sin(grade)) where g is the gravitational constant (9.81 m/sec²) and grade=the grade or inclination angle with respect to a horizontal plane.

The power requirement $P_{DL}$ for the first estimate of the next acceleration $A_{next\,first}$ may be determined using the following relationship:

$$P_{DL}=F_{total}*V$$

where V is a desired speed of the vehicle 100 on the given road. The desired speed V may be set or determined using any desired method. In one or more arrangements, the speed V may be based on a speed limit on the stretch of road on which the vehicle is currently driving, as determined from environment sensors, map date, etc. In particular embodiments, a factor may be applied to the speed limit to account for actual driving. For example, if the speed limit is 25 mph, the speed V may be set to 30 mph to account for possible speeding by the driver of vehicle 100.

Simultaneously with determination of the power requirement $P_{DL}$, and following a determination in block 726 of FIG. 8 that the environment learning conditions exist, the required power estimation module 124 may, in block 802, generate a second estimate of the next acceleration $A_{next\,second}$ required by the vehicle 100. In one or more arrangements, the second estimate of the next acceleration $A_{next\,second}$ may be determined by multiplying the maximum forward vehicle acceleration $A_{max}$ shown in FIG. 4 with the mirroring coefficient $D_{mirror}$ determined from FIG. 5 as previously described:

$$A_{next\,second}=A_{max}*D_{mirror}$$

In block 803, the required power estimation module 124 may, using the second estimate of the next acceleration $A_{next\,second}$, generate an estimate of the power requirement $P_{EL}$ for the second estimate of the next acceleration $A_{next\,second}$. In one or more arrangements, the estimate of the power requirement $P_{EL}$ for the second estimate of the next acceleration $A_{next\,second}$ may be determined using the following steps.

A total force $F_{EL}$ required to move the vehicle 100 at the second estimate of the next acceleration $A_{next\,second}$ may be calculated using the following relationship:

$$F_{EL}=(A_{next\,second}*M)+F_{roadload}+F_{grade}$$

where M=the mass of the vehicle, $F_{roadload}$=the road load, and $F_{grade}$=a component of the total force required to overcome the road grade.

The power requirement $P_{EL}$ for the second estimate of the next acceleration $A_{next\,second}$ may be determined using the following relationship:

$$P_{EL}=F_{EL}*V$$

where V is the desired speed of the vehicle 100 on the given road.

Following the determination of the parameters $P_{EL}$ and $P_{DL}$, the values of these parameters may be compared in block 808 to obtain the estimated final power requirement $P_{EST\,FINAL}$. In one or more arrangements, the power requirement $P_{EL}$ or $P_{DL}$ having the greater value may be taken as the estimated final power requirement $P_{EST\ FINAL}$. This value may be passed to block 910 of the propulsion system control module 117.

Returning to block 724 of FIG. 8, if the driver learning conditions exist but the environment learning conditions do not exist (or their existence or non-existence cannot be determined), control may pass to block 810 of the required power estimation module 124, where the value of $P_{DL}$ may be determined as described above. In a case where the environment learning conditions do not exist (or their existence or non-existence cannot be determined), the value of $P_{DL}$ may be taken as the estimated final power requirement $P_{EST\ FINAL}$. The value of the estimated final power requirement may then be passed to block 910 of the propulsion system control module 117.

Figure 10:
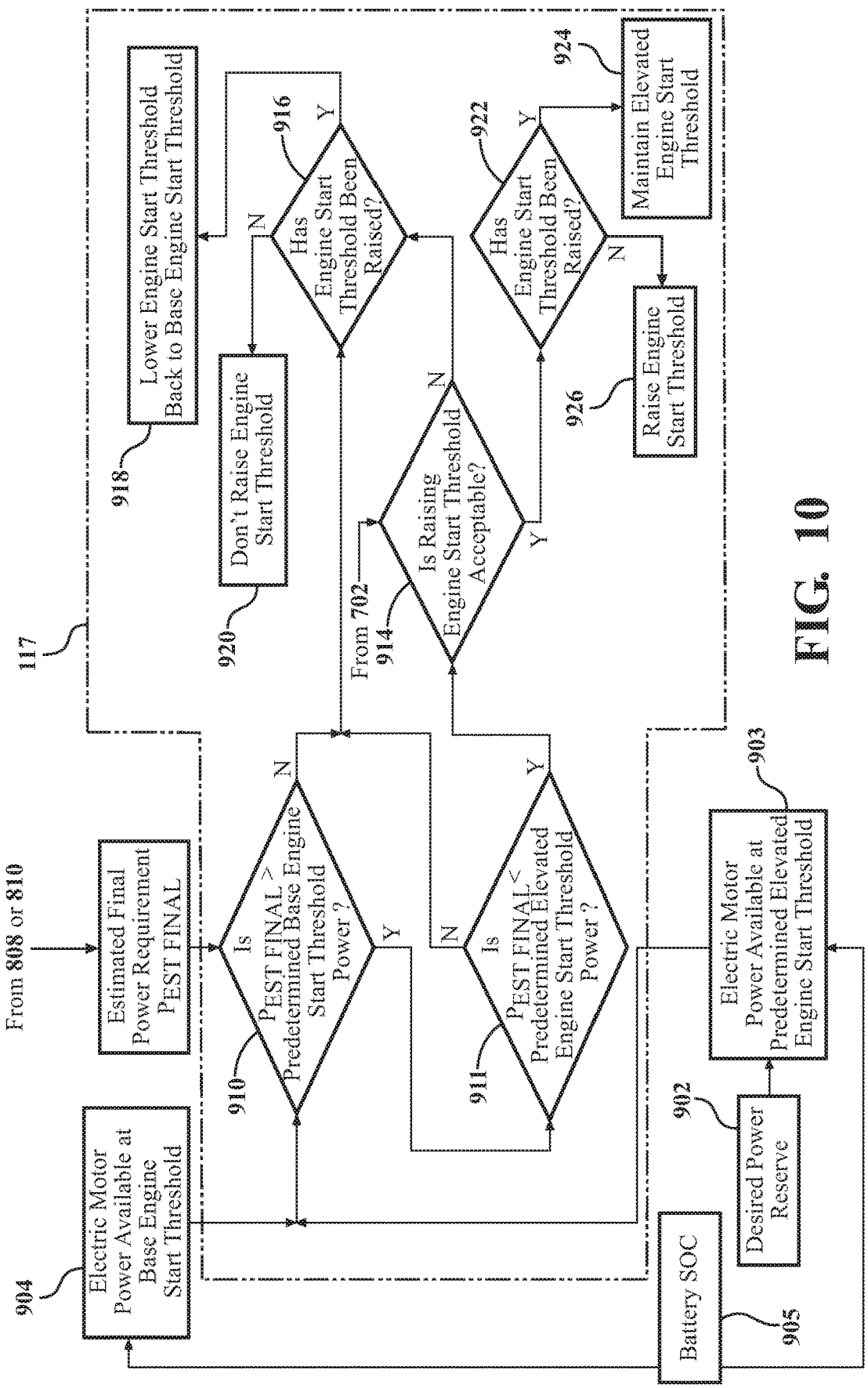
FIG. 10 is a flow diagram illustrating an operating mode of a propulsion system control module in accordance with an embodiment described herein.

FIG. 10 is a flow diagram illustration of an operating mode of the propulsion system control module 117 in accordance with an embodiment described herein. Referring to FIG. 10, the estimated final power requirement $P_{EST\ FINAL}$ from block 808 or 810 may be received in block 910. Another input to block 910 may be the electric motor power available at the predetermined base engine start threshold (block 904). This may be determined from the known battery state of charge in block 905. Another input to block 910 may be the electric motor power available at the predetermined elevated engine start threshold (from block 903). This may determine from the known battery state of charge in block 905 and the desired power reserve (block 902) as described elsewhere herein. This represents a maximum allowable power demand level from the electric motor based on the battery SOC.

In block 910, the propulsion system control module 117 may determine if the estimated final power requirement $P_{EST\ FINAL}$ is greater than the predetermined base engine start threshold power. if the estimated final power requirement $P_{EST\ FINAL}$ is not greater than the predetermined base engine start threshold power, the module 117 may determine (in block 916) if the engine start threshold is currently in a raised condition. If the engine start threshold is not currently in a raised condition, the module 117 may (in block 920) maintain the threshold at the predetermined base engine start threshold. If the engine start threshold is currently in a raised condition, the module 117 may (in block 918) lower the engine start threshold to the predetermined base engine start threshold.

Returning to block 910, if the estimated final power requirement $P_{EST\ FINAL}$ is greater than the predetermined base engine start threshold power, the module 117 may (in block 911) determine if the estimated final power requirement $P_{EST\ FINAL}$ is less than the predetermined elevated engine start threshold power. If the estimated final power requirement $P_{EST\ FINAL}$ is not less than the predetermined elevated engine start threshold power, control may pass to block 916. However, if the estimated final power requirement $P_{EST\ FINAL}$ is less than the predetermined elevated engine start threshold power, the module 117 may determine (in block 914) if it is acceptable to raise the engine start threshold based on the existence of the other predetermined conditions as determined in FIG. 8. If it is unacceptable to raise the engine start threshold because one or more of the other predetermined conditions do not currently exist, control may pass to block 916. However, if it is acceptable to raise the engine start threshold, the propulsion system control module 117 may control operation of the vehicle so as to ensure that the engine start threshold is at the predetermined elevated engine start threshold. To this end, control may pass to block 922, where the module 117 determines if the engine start threshold is currently raised. If the engine start threshold is currently raised, the module may (in block 924) maintain the engine start threshold at the elevated level. If the engine start threshold is not currently raised, the module may (in block 926) raise the engine start threshold to the predetermined elevated engine start threshold.

In addition, as described herein, a method is provided for controlling an internal combustion engine start threshold in a parallel hybrid-electric vehicle. The method includes steps of determining whether or not conditions of a plurality of predetermined conditions exist and, responsive to a determination that one or more conditions of the plurality of predetermined conditions do not exist, controlling operation of the vehicle so as to ensure that the engine start threshold is at a predetermined base engine start threshold. Responsive to a determination that the conditions of the plurality of predetermined conditions exist, a next acceleration required by the vehicle is estimated. Using the estimated next acceleration required by the vehicle, a final power requirement for the next acceleration is estimated. If the estimated final power requirement is between a first amount of electric motor power available at a predetermined base engine start threshold and a second amount of electric motor power available at a predetermined elevated engine start threshold above the predetermined base engine start threshold, operation of the vehicle may be controlled so as to ensure that the engine start threshold is at the predetermined elevated engine start threshold. If the estimated final power requirement is not between the first and second amounts of electric motor power, operation of the vehicle may be controlled so as to ensure that the engine start threshold is at the predetermined base engine start threshold.

In addition, as described herein, a non-transitory computer readable medium is provided for controlling an internal combustion engine start threshold in a parallel hybrid-electric vehicle. The medium includes stored therein instructions that, when executed by a computing system, cause the computing system to perform functions comprising determining whether or not conditions of a plurality of predetermined conditions exist and, responsive to a determination that one or more conditions of the plurality of predetermined conditions do not exist, controlling operation of the vehicle so as to ensure that the engine start threshold is at a predetermined base engine start threshold. Responsive to a determination that the conditions of the plurality of predetermined conditions exist, an estimate of a next acceleration required by the vehicle may be generated. Using the estimated next acceleration required by the vehicle, an estimate of a final power requirement for the next acceleration may be generated. If the estimated final power requirement is between a first amount of electric motor power available at a predetermined base engine start threshold and a second amount of electric motor power available at a predetermined elevated engine start threshold above the predetermined base engine start threshold, operation of the vehicle may be controlled so as to ensure that the engine start threshold is at the predetermined elevated engine start threshold. If the estimated final power requirement is not between the first and second amounts of electric motor power, operation of the vehicle may be controlled so as to ensure that the engine start threshold is at the predetermined base engine start threshold.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1A-10, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for controlling an internal combustion engine start threshold in a parallel hybrid-electric vehicle, the system comprising:
   one or more processors; and
   a memory communicably coupled to the one or more processors and storing:
   a predetermined conditions tracking module including computer-readable instructions that when executed by the one or more processors cause the one or more processors to determine whether or not one or more conditions of a plurality of predetermined conditions exist;

a required power estimation module including the computer-readable instructions that when executed by the one or more processors cause the one or more processors to:

responsive to a determination that the one or more conditions of the plurality of the predetermined conditions exist, estimate a next acceleration required by the vehicle; and using the estimated next acceleration required by the vehicle, estimate a final power requirement for the next acceleration; and a propulsion system control module including the computer-readable instructions that when executed by the one or more processors cause the one or more processors to:

determine whether the estimated final power requirement is between a first amount of electric motor power available at a predetermined base engine start threshold and a second amount of electric motor power available at a predetermined elevated engine start threshold above the predetermined base engine start threshold; and when the estimated final power requirement is between the first amount of electric power and the second amount of electric motor power, control operation of the vehicle so as to ensure that the internal combustion engine start threshold is at the predetermined elevated engine start threshold;

determine, after controlling the operation of the vehicle so as to ensure that the internal combustion engine start threshold is at the predetermined elevated engine start threshold, that the one or more determined conditions of the plurality of the predetermined conditions no longer exists; and responsive to the determination that the one or more determined conditions no longer exists, control the operation of the vehicle so as to automatically lower the internal combustion engine start threshold to the predetermined base engine start threshold.

2. The system of claim 1 wherein the propulsion system control module includes the computer-readable instructions that when executed by the one or more processors cause the one or more processors to, responsive to a determination that at least one condition of the plurality of the predetermined conditions does not exist;

when the internal combustion engine start threshold resides at the predetermined base engine start threshold, control the operation of the vehicle so as to maintain the internal combustion engine start threshold at the predetermined base engine start threshold.

3. The system of claim 1 wherein the plurality of the predetermined conditions include driver learning conditions, and wherein the required power estimation module includes the computer-readable instructions that when executed by the one or more processors cause the one or more processors to:

responsive to existence of the driver learning conditions, generate a first estimate of the next acceleration required by the vehicle; and using the first estimate of the next acceleration, generate an estimate of a power requirement for the first estimate of the next acceleration.

4. The system of claim 3 wherein the driver learning conditions include one or more of:

a condition where a forward vehicle has completed three speed variation cycles within an associated predetermined time period, each speed variation cycle including exceeding a predetermined upper limit speed followed by falling below a predetermined lower limit speed;

a condition where a maximum speed of the forward vehicle during an associated predetermined time period is less than a predetermined maximum allowable speed;

a condition where a maximum acceleration of the forward vehicle during an associated predetermined time period is less than a predetermined maximum allowable acceleration; and a condition where a delta pedal of the vehicle remains below a predetermined threshold for an associated predetermined time period; and a condition where a power demand on a hybrid vehicle system electric motor during an associated predetermined time period has been constantly below a predetermined threshold.

5. The system of claim 3 wherein the plurality of the predetermined conditions include environment learning conditions, and wherein the required power estimation module includes the computer-readable instructions that when executed by the one or more processors cause the one or more processors to, simultaneously with generation of the estimate of the power requirement for the first estimate of the next acceleration, and responsive to existence of the environment learning conditions, generate a second estimate of the next acceleration required by the vehicle; and using the second estimate of the next acceleration, generate an estimate of the power requirement for the second estimate of the next acceleration.

6. The system of claim 5 wherein the environment learning conditions include one or more of:

a condition where a forward vehicle has completed three speed variation cycles within an associated predetermined time period, each speed cycle including exceeding a predetermined upper limit speed followed by falling below a predetermined lower limit speed;

a condition where a maximum speed of the forward vehicle during an associated predetermined time period is less than predetermined maximum allowable speed;

a condition where a maximum acceleration of the forward vehicle during an associated predetermined time period is less than predetermined maximum allowable acceleration; and a condition where a mirroring coefficient of the vehicle is less than 1.25 during an associated predetermined time period.

7. The system of claim 5 wherein the required power estimation module includes computer-readable instructions that when executed by the one or more processors cause the one or more processors to:

compare the estimate of the power requirement for the first estimate of the next acceleration with the estimate of the power requirement for the second estimate of the next acceleration; and assign, as the estimated final power requirement, the greater of the estimate of the power requirement for the first estimate of the next acceleration and the estimate of the power requirement for the second estimate of the next acceleration.

8. The system of claim 1 wherein the plurality of the predetermined conditions includes a condition where the vehicle is driving in a stop-and-go traffic condition.

9. The system of claim 1 wherein the plurality of the predetermined conditions includes a condition where a temperature of a hybrid vehicle system battery is determined to be within a predetermined range.

10. The system of claim 1 wherein the plurality of the predetermined conditions includes a condition where a state of charge of a hybrid vehicle system battery is determined to be within a predetermined range.

11. The system of claim 1 wherein the plurality of the predetermined conditions includes a condition where a mass of the vehicle has been estimated.

12. The system of claim 1 wherein the plurality of the predetermined conditions includes a condition where a road load on the vehicle has been estimated.

13. The system of claim 1 wherein the plurality of the predetermined conditions includes a condition where a grade of a road on which the vehicle is traveling has been estimated or determined.

14. The system of claim 1 wherein the plurality of the predetermined conditions includes a condition where a lane change option is unavailable for the vehicle.

15. The system of claim 1 wherein the plurality of the predetermined conditions includes a condition where a traffic control element is not detectable by a camera of the vehicle.

16. The system of claim 1 wherein the plurality of the predetermined conditions includes a condition where a speed of the vehicle is below a predetermined threshold.

17. The system of claim 1 wherein the plurality of the predetermined conditions includes a condition where no activated turn signals are visible to a camera of the vehicle.

18. A non-transitory computer readable medium for controlling an internal combustion engine start threshold in a parallel hybrid-electric vehicle, the medium having stored therein instructions that, when executed by a computing system, cause the computing system to perform functions comprising:
   determining whether or not one or more conditions of a plurality of predetermined conditions exist;
   responsive to a determination that one or more conditions of the plurality of the predetermined conditions do not exist, controlling operation of the vehicle so as to ensure that the internal combustion engine start threshold is at a predetermined base engine start threshold;
   responsive to a determination that the one or more conditions of the plurality of the predetermined conditions exist, estimating a next acceleration required by the vehicle;
   using the estimated next acceleration required by the vehicle, estimating a final power requirement for the next acceleration; and
   determining whether the estimated final power requirement is between a first amount of electric motor power available at a predetermined base engine start threshold and a second amount of electric motor power available at a predetermined elevated engine start threshold above the predetermined base engine start threshold;
   when the estimated final power requirement is between the first amount of electric motor power and the second amount of electric motor power, controlling the operation of the vehicle so as to ensure that the internal combustion engine start threshold is at the predetermined elevated engine start threshold; and
   when the estimated final power requirement is not between the first amount of electric motor power and the second amount of electric motor power, controlling the operation of the vehicle so as to ensure that the engine start threshold is at the predetermined base engine start threshold,
   determine, after controlling the operation of the vehicle so as to ensure that the internal combustion engine start threshold is at the predetermined elevated engine start threshold, that the one or more of the determined conditions of the plurality of the predetermined conditions has ceased to exist; and
   responsive to the determination that the one or more of the determined conditions has ceased to exist, control the operation of the vehicle so as to ensure that the internal combustion engine start threshold is at the predetermined base engine start threshold.

19. A method for controlling an internal combustion engine start threshold in a parallel hybrid-electric vehicle, comprising steps of:
   determining whether or not conditions of a plurality of predetermined conditions exist;
   responsive to a determination that one or more conditions of the plurality of predetermined conditions do not exist, controlling operation of the vehicle so as to ensure that the internal combustion engine start threshold is at a predetermined base engine start threshold;
   responsive to a determination that the conditions of the plurality of the predetermined conditions exist, estimating a next acceleration required by the vehicle;
   using the estimated next acceleration required by the vehicle, estimating a final power requirement for the next acceleration; and
   determining whether the estimated final power requirement is between a first amount of electric motor power available at a predetermined base engine start threshold and a second amount of electric motor power available at a predetermined elevated engine start threshold above the predetermined base engine start threshold;
   when the estimated final power requirement is between the first amount of electric motor power and the second amount of electric motor power, controlling the operation of the vehicle so as to ensure that the internal combustion engine start threshold is at the predetermined elevated engine start threshold; and
   when the estimated final power requirement is not between the first amount of electric motor power and the second amount of electric motor power, controlling the operation of the vehicle so as to ensure that the internal combustion engine start threshold is at the predetermined base engine start threshold;
   determining, after controlling the operation of the vehicle so as to ensure that the internal combustion engine start threshold is at the predetermined elevated engine start threshold, that the one or more of the determined conditions of the plurality of the predetermined conditions has ceased to exist; and
   responsive to the determination that the one or more of the determined conditions has ceased to exist, controlling the operation of the vehicle so as to ensure that the internal combustion engine start threshold is at the predetermined base engine start threshold.

20. The method of claim 19 wherein the step of controlling the operation of the vehicle so as to ensure that the internal combustion engine start threshold is at the predetermined base engine start threshold comprises steps of:
   when the internal combustion engine start threshold resides at the predetermined elevated engine start threshold, controlling the operation of the vehicle so as to lower the internal combustion engine start threshold to the predetermined base engine start threshold; and when the internal combustion engine start threshold resides at the predetermined base engine start threshold, controlling the operation of the vehicle so as to maintain the internal combustion engine start threshold at the predetermined base engine start threshold.

\* \* \* \* \*